(12) United States Patent
Beev et al.

(10) Patent No.: US 9,939,120 B2
(45) Date of Patent: Apr. 10, 2018

(54) LIGHTING DEVICE WITH OPTICAL WAVEGUIDES

(71) Applicant: Valeo Vision, Bobigny (FR)

(72) Inventors: Kostadin Beev, Emerainville (FR); Jean-Claude Puente, Livry-Gargan (FR); Vincent Godbillon, Paris (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/296,470

(22) Filed: Oct. 18, 2016

(65) Prior Publication Data

US 2017/0114976 A1  Apr. 27, 2017

(30) Foreign Application Priority Data

Oct. 23, 2015 (FR) .................................... 15 60145

(51) Int. Cl.
| | |
|---|---|
| *F21S 8/10* | (2006.01) |
| *H05B 33/08* | (2006.01) |
| *H05B 37/02* | (2006.01) |
| *B60Q 1/14* | (2006.01) |
| *B60Q 3/64* | (2017.01) |
| *B60Q 3/62* | (2017.01) |

(52) U.S. Cl.
CPC .......... *F21S 48/1241* (2013.01); *B60Q 1/143* (2013.01); *B60Q 3/62* (2017.02); *B60Q 3/64* (2017.02); *F21S 48/115* (2013.01); *F21S 48/125* (2013.01); *F21S 48/1394* (2013.01); *H05B 33/0854* (2013.01); *H05B 37/0227* (2013.01); *B60Q 2300/30* (2013.01); *B60Q 2300/42* (2013.01)

(58) Field of Classification Search
CPC .... F21S 48/1241; F21S 48/115; F21S 48/125; F21S 48/1394; B60Q 1/143; B60Q 3/62; B60Q 3/64; B60Q 2300/30; B60Q 2300/42; H05B 33/0854; H05B 37/0227
USPC ................................. 362/511, 581, 551, 616
See application file for complete search history.

(56) References Cited

U.S. PATENT DOCUMENTS 7,560,742 B2   7/2009 Wilson et al.
7,616,271 B2 * 11/2009 Souk .................... G02B 6/0068
                                                      349/62
(Continued)

FOREIGN PATENT DOCUMENTS

DE   102009053581 B3   3/2011
DE   102011054232 A1   4/2013
(Continued)

*Primary Examiner* — Laura Tso
(74) *Attorney, Agent, or Firm* — Oblon, McClelland, Maier & Neustadt, L.L.P.

(57) ABSTRACT

A lighting device that includes a series of optical waveguides each able to allow rays of light to be waveguided between an entry face, arranged at a proximal end of the optical waveguide, and an exit face. The device is formed of at least two subassemblies produced separately and each including at least a portion of the series of optical waveguides and first structural elements for retaining the waveguides in position and joining successive optical waveguides of the subassembly together, the two subassemblies being able to be assembled to form the device through collaboration of the first structural elements. The distal ends of at least two successive optical waveguides of the series are connected by a piece of translucent or transparent flexible material.

19 Claims, 2 Drawing Sheets

(56) References Cited

U.S. PATENT DOCUMENTS

| | | | |
|---|---|---|---|
| 7,712,907 B2* | 5/2010 | Zyka | G02B 5/045 |
| | | | 362/16 |
| 7,795,634 B2 | 9/2010 | Wilson et al. | |
| 2004/0041984 A1 | 3/2004 | Tani et al. | |
| 2007/0120137 A1 | 5/2007 | Wilson et al. | |
| 2009/0237952 A1 | 9/2009 | Wilson et al. | |
| 2010/0195342 A1* | 8/2010 | Lambert | F21S 48/215 |
| | | | 362/511 |
| 2011/0292684 A1* | 12/2011 | Ajichi | G02B 6/008 |
| | | | 362/616 |
| 2012/0134179 A1* | 5/2012 | Que | G02B 6/008 |
| | | | 362/616 |
| 2013/0094234 A1 | 4/2013 | Kloos | |
| 2014/0104864 A1 | 4/2014 | Brendle | |
| 2014/0247616 A1* | 9/2014 | Arrivet | B60Q 1/0052 |
| | | | 362/511 |
| 2014/0321141 A1 | 10/2014 | Bauer et al. | |
| 2015/0211704 A1 | 7/2015 | Wintzer et al. | |
| 2016/0146416 A1* | 5/2016 | Taudt | G02B 19/0028 |
| | | | 362/511 |
| 2016/0252226 A1* | 9/2016 | Shih | F21S 48/1241 |
| | | | 362/511 |
| 2016/0273727 A1 | 9/2016 | Maier et al. | |

FOREIGN PATENT DOCUMENTS

| | | |
|---|---|---|
| EP | 1396753 A1 | 3/2004 |
| EP | 2719940 A2 | 4/2014 |
| WO | 2013075157 A1 | 5/2013 |
| WO | 2014056568 A1 | 4/2014 |
| WO | 2015061822 A1 | 5/2015 |

* cited by examiner

LIGHTING DEVICE WITH OPTICAL WAVEGUIDES

CROSS-REFERENCE TO RELATED APPLICATIONS

This application claims priority to the French application 1560145, filed Oct. 23, 2015, which application is incorporated herein by reference and made a part hereof.

BACKGROUND OF THE INVENTION

1. Field of the Invention

The invention concerns the field of lighting and/or signaling, notably for motor vehicles. It more particularly concerns a lighting device with optical waveguides adapted to be installed in a headlight lighting module.

2. Description of the Related Art

A motor vehicle is equipped with headlights, or headlamps, intended to illuminate the road in front of the vehicle, at night or under low light conditions, by means of an overall light beam. These headlights, a left-hand headlight and a right-hand headlight, include one or more lighting modules each adapted to generate and to direct an intermediate light beam the combination of which forms the overall light beam.

These headlights can generally be used in two lighting modes: a first or "high beam" mode and a second or "low beam" mode. The "high beam" mode enables the road to be strongly lit to a great distance in front of the vehicle. The "low beam" mode produces lighting of the road that is more limited, although nevertheless offering good vision, without dazzling other road users. The two lighting modes, "high beam" and "low beam", are complementary and a change is made from one to the other as a function of traffic conditions. Switching from one mode to the other may be effected manually, the driver deciding when to switch over, or automatically, as a function of the detection by appropriate means of conditions requiring such a change of lighting mode.

There nevertheless exists a requirement, in the motor vehicle field, to be able to illuminate the road ahead in "partial road lighting mode", namely to generate in a high beam one or more dark regions corresponding to the locations of vehicles approaching in the opposite direction or vehicles traveling in front, so as to avoid dazzling other drivers, while at the same time illuminating the greatest possible area of the road. Such a function is referred to as an adaptive driving beam (ADB) or "selective beam" function. This kind of ADB function consists on the one hand in automatically detecting a road user liable to be dazzled by a lighting beam emitted by a headlight in high beam mode and on the other hand in modifying the contour of this lighting beam so as to create a shadow region at the location of the road user who has been detected. The ADB function has multiple advantages: user friendliness, improved vision compared to lighting in low beam mode, improved reliability for the change of mode, greatly reduced risk of dazzle, safer driving.

Selective beam producing lighting modules are known in which optical waveguides are disposed side-by-side, each being illuminated by a respective light source so that the light beam at the exit of the module is divided into contiguous segments that can be turned off or turned on as a function of instructions resulting from the detection of a vehicle nearby.

The shape and the arrangement of the waveguides relative to one another in a module of a headlight must be very accurate, on the one hand to be able to produce a smooth and homogeneous intermediate beam at the exit from the module when all the segments are turned on and on the other hand to be able to offer an intermediate beam complementary to the intermediate beam produced exiting the other headlight.

SUMMARY OF THE INVENTION

The invention falls within this context and seeks to propose a lighting device that allows simple and effective implementation of a matrix lighting function and the lighting and/or signaling functions of which offer at least the same level of performance as before, and do so at lower cost, notably without the need for manufacturing conditions prejudicial to mass production. To this end, a subject of the invention is a lighting device including a series of optical waveguides each able to allow rays of light to be waveguided between an entry face, arranged at a proximal end of the optical waveguide, and an exit face, in which two subassemblies produced separately when assembled form the lighting device. Each subassembly includes at least in a portion of the series of optical waveguides and first structural elements for retaining the waveguides in position and joining successive optical waveguides of the subassembly, notably at the level of the proximal ends of the optical waveguides, the two subassemblies being able to be assembled to form the device through collaboration of the first structural elements, notably at the level of the entry faces. Moreover, the distal ends of at least two successive optical waveguides of the series are connected by a piece of translucent or transparent flexible material.

It is thus possible to compensate for defects with the assembly obtained by assembling the two subassemblies, notably in terms of the relative position of the distal ends of the waveguides, through the presence of this flexible material which plugs the gaps left between the waveguides at the time of assembly and allows the light to pass toward an exit face by its transparency.

In accordance with one particular feature of the invention, the optical waveguides are disposed so that the respective distal ends, carrying the exit face, of two adjacent waveguides are in contact with each other and so that the respective proximal ends, carrying the entry face, of these two adjacent waveguides are transversely spaced from each other. Clearly, on the one hand the proximal ends of the waveguides must be spaced so that the light emitted by one light source toward one optical waveguide does not enter the adjacent waveguide and on the other hand the distal ends of the waveguides must be bonded to one another successively to avoid dark regions between the light segments formed by the waveguides and projected toward the projection device at the exit of the module.

The presence of the piece of translucent or transparent flexible material overlapping the distal ends of the waveguides makes it possible to compensate for any gaps there may be between two waveguides and the formation of these dark regions.

Within this fan shape, the distal ends of the adjacent optical waveguides may be pressed against one another over a particular overlap portion, which may notably assume a value substantially equal to 1 mm. Furthermore, the transverse spacing of the proximal ends of the two adjacent optical waveguides may be less than or equal to 5 mm.

According to a first series of features, considered alone or in combination, provision may be made for:

the distal end of each of the optical waveguides to be covered by the piece of flexible material which forms a continuous strip extending downstream of the entire series of waveguides;

the piece of flexible material to be deformed by the pressure of the subassemblies assembled with one another;

the piece of flexible material to be overmolded on the distal ends of the optical waveguides;

the piece of flexible material to have a continuous face extending away from the optical waveguides and forming a common exit face that the waveguides of the lighting device have in common;

a means of keeping the piece of flexible material in position to be mechanically connected to at least part of the first structural elements;

the piece of flexible material to be disposed between at least two distal ends of two successive optical waveguides of the device.

According to another series of features, considered alone or in combination, relating to a particular structure in which at least a first subassembly further includes a second structural element, distinct from the first structural element and able to connect the distal ends of the optical waveguides of this first subassembly, provision may be made for:

the second structural element to consist of a strip made of a translucent or transparent material and disposed transversely, downstream of the distal ends in the path of the rays of light, the strip and two successive waveguides of this first subassembly defining a housing to accommodate a distal end of a waveguide of a second subassembly so that the exit face of this waveguide rests against the strip;

the piece of flexible material to be disposed in the accommodating housing;

the piece of flexible material to be overmolded on the distal end of the optical waveguide of the second subassembly;

the piece of flexible material to be overmolded on the second structural element and on the face of the successive waveguides of the first subassembly defining the accommodating housing.

In accordance with features specific to the composition of the piece of flexible material, provision may be made for:

In accordance with other features of the invention, considered separately or in combination, each optical waveguide includes at least a lower face and an upper face that extend between the ends of the entry face and of the exit face, the lower face being a reflection face. The optical waveguides are also defined by lateral faces extending similarly between the ends of the entry face and of the exit face. This lower face may have a substantially elliptical shape a first focus of which coincides with the location of a source emitting rays of light which is disposed near, and notably at the level of, the entry face of the waveguide and a second focus of which is situated at the level of the exit face. The second focus of the lower face may be situated at the level of the edge joining the upper face and the exit face.

The subassemblies or at the very least the optical waveguides of the subassemblies, or even the subassemblies, may be made from a material enabling the propagation of the rays of light by total internal reflection from the entry face toward the exit face, for example polycarbonate (PC) or polymethyl methacrylate (PMMA) or silicone or glass. Where appropriate, the optical waveguides may all be made from the same material.

Advantageously, the piece of translucent or transparent flexible material is made from a material that has a refractive index substantially close to, or even identical to, that of the material of the optical waveguides.

Furthermore, provision is made for the piece of flexible material to be made from a material that has flexibility greater than the flexibility of the material used to make the optical waveguides. The flexible material may notably be a liquid silicone elastomer.

The invention also relates to a lighting module for a motor vehicle headlight in which there are provided at least first means including a lighting device as just described above to participate in the production of a plurality of light segments that can be activated selectively.

In one particular application of the lighting device of the invention, the lighting module may include second means adapted to produce a first cut-off beam directed toward a projection device arranged at the exit of the module, the light segments produced by the first means forming a second beam directed toward the projection device and complementary to the cut-off beam when they are activated simultaneously.

The second means may notably consist in a first submodule adapted to produce a low beam, notably having an oblique cut-off portion. The projection device may furthermore be a lens but could moreover take other known forms.

It is notable that the second means include, for the production of the cut-off beam, at least one optical means, notably of the reflector or collimator type, at least one light source disposed at the level of a focus of the optical means and a shield, which may or may not be provided with a reflective coating, disposed in the path of the rays of light emanating from the light source and deflected by the optical means, and it is notable that the optical waveguides of the lighting device are disposed in such a way as to be in contact with the shield. The optical waveguides may be oriented so as to be in contact with the shield only in the vicinity of the focal area of the projection device. According to the invention, provision may be made for contact with the shield to be made at the level of the piece of flexible material.

The invention also concerns a lighting system, comprising at least one lighting module as described above and control means for turning on, turning off or modifying the luminous power emitted by the first means and the second means of the lighting module.

A module could also be provided to detect a body on the road that is not to be dazzled. This detection module may for example consist in a camera facing the road in front of the vehicle and associated image processing means that make it possible to generate detection information that the detection module is able to send to the control means for turning on, turning off or modifying the luminous power emitted by each light source as a function of that detection information.

It is advantageous to provide a lighting system in which at least one module in accordance with the invention is disposed in a left-hand headlight and at least one other module in accordance with the invention is disposed in a right-hand headlight. The module disposed in the left-hand headlight includes a lighting device with a first subassembly of optical waveguides of a first type and a second subassembly of optical waveguides of a second type while the module disposed in the right-hand headlight includes a second lighting device with a first subassembly of optical waveguides of a third type and a second subassembly of optical waveguides of a second type, similar to the second subassembly of the first lighting device.

The modules may be arranged relative to one another, either within the same headlight or between the two headlights, so that at least a beam portion, for example a segment, produced by one of the modules overlaps at least a beam portion, in the example a segment, produced by another of the modules.

These and other objects and advantages of the invention will be apparent from the following description, the accompanying drawings and the appended claims.

BRIEF DESCRIPTION OF THE ACCOMPANYING DRAWINGS

Other features and advantages of the present invention will become more clearly apparent in the light of the description and the drawings, in which.

DETAILED DESCRIPTION OF THE PREFERRED EMBODIMENTS

The lighting device 1 according to the invention is formed of two distinct subassemblies 2 and 4 that get assembled with one another, and at least one piece of flexible material 5 able to join the subassemblies 2 and 4 together. A first embodiment will now be described with reference to FIGS. 1 to 4 in which the piece of flexible material 5 overlaps ends of these two subassemblies 2, 4.

Figure 4:
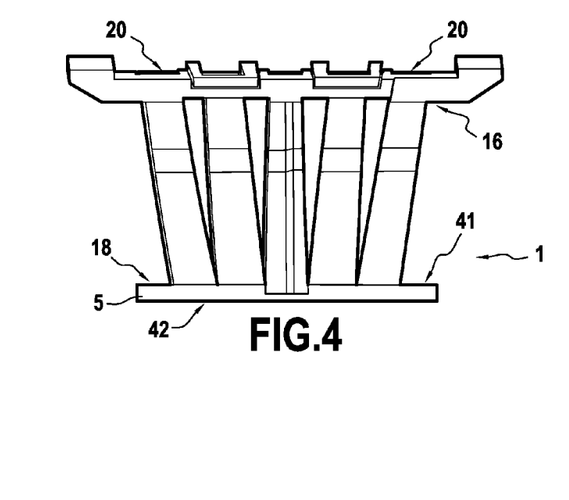
FIG. 4 is a face-on view of the lighting device according to a first embodiment, when the components of FIG. 3 are assembled.

The assembled device, visible in FIG. 4, here includes five optical waveguides 6 comprising a central waveguide 8, two intermediate waveguides 10 and two lateral waveguides 12 arranged transversely in series so that there are found in succession a lateral waveguide 12, an intermediate waveguide 10, the central waveguide 8, an intermediate waveguide 10 and a lateral waveguide 12. The lighting device 1 also includes first structural elements 14 for holding the waveguides 8, 10, 12 in position, which join the corresponding proximal ends 16 of the waveguides 8, 10, 12 together.

Each optical waveguide 6 is adapted to waveguide by total internal reflection rays of light emitted by a light source associated with the optical waveguides 6 to direct them on leaving the optical waveguides 6 toward a lens type projection device. To this end, each optical waveguide 6 has a light entry face 20 arranged at the proximal end 16 of each optical waveguide 6 and facing which the light source, for example a semiconductor light source, notably a light emitting diode, is disposed and a light exit face 22 arranged at the distal end 18, as well as a lower face 24 referred to as the reflection face and visible only in FIG. 5, and an upper face 26 referred to as the front face, which extend between the ends of the entry face 20 and of the exit face 22, as do the lateral faces 27.

Clearly, to enable the guiding of the rays of light inside the waveguides 8, 10, 12, each subassembly 2, 4 is produced in a material enabling guiding of the rays of light by total internal reflection from the entry face 20 toward the exit face 22. Such a material could consist of polycarbonate (PC), polymethyl methacrylate (PMMA), silicone or glass, for example.

The height of an optical waveguide 6 is arbitrarily defined as the dimension between the reflection face 24 and the front face 26, in a vertical direction, whereas the length of the optical waveguide 6 is defined as the dimension between the entry face 20 and the exit face 22 in a longitudinal direction, and the width of the optical waveguide 6 corresponds to the dimension in the transverse direction in which the waveguides 8, 10, 12 are in series.

The reflection face 24 has a substantially elliptical shape a first focus of which coincides with the location of the light source and a second focus of which, referred to as the focusing focus, is situated at the level of the edge 28 joining the front face 26 and the exit face 22 so that the rays of light reflected in each optical waveguide 6 exit the optical waveguide 6 primarily at the top of the exit face 22.

The lighting device 1 has a substantially symmetrical layout on either side of the central waveguide 8, except for the height of each symmetrical portion. The height of the optical waveguides 6 is different according to whether the optical waveguides 6 are disposed on one side or the other of the central waveguide 8, and the central waveguide 8 has an exit face 22 with the edge 28 joining it to the front face 26 cropped to feature a vertical or oblique step so as substantially to form a staircase step. As shown in the figures, the waveguides 10, 12 disposed to the right of the central waveguide 8, when viewing the device facing the exit faces 22 of the waveguides 10, 12, have a height less than that of the waveguides 10, 12 disposed on the left of the central waveguide 8. In other words, the central waveguide 8 has an exit face 22 adapted to have a lateral edge, the height of which corresponds to that of the distal end 18 of the waveguides 10, 12 disposed on one side of the central waveguide 8, another lateral edge, the height of which corresponds this time to that of the distal end 18 of the waveguides 10, 12 disposed on the other side of the central waveguide 8, and an upper edge connecting the two lateral edges and including the step.

The optical waveguides 6 are disposed and held in position at least by the first structural elements 14 so as to be in transverse series, in a fan arrangement. By a fan arrangement of the optical waveguides 6 of the lighting device 1 is meant an arrangement in which the respective distal ends 18 of the optical waveguides 6 carrying the light exit faces 22 are stuck together and in which the respective proximal ends 16 carrying the light entry faces 20 facing the light sources are spaced transversely from one another. The proximal ends 16 must be spaced apart, both so that the light emitted by one light source toward one optical waveguide 6 does not enter the adjacent optical waveguide 6 and so as to limit the extent to which adjacent light sources heat one another, and the distal ends 18 of the optical waveguides 6 must be stuck successively to one another to prevent dark regions between the light segments formed by the optical waveguides 6 and projected toward the projection device at the exit from the module. As shown, it is advantageous for the distal ends 18 of the optical waveguides 6 to be pressed together over a particular distance, which may be approximately 1 mm, for example, so as to form an overlapping portion of the light segments and to ensure continuous illumination when all the segments are lit.

As has already been specified, the lighting device 1 is formed of two separate subassemblies 2, 4 that are assembled against one another and connected at least in part using a piece of flexible material 5.

Figure 1:
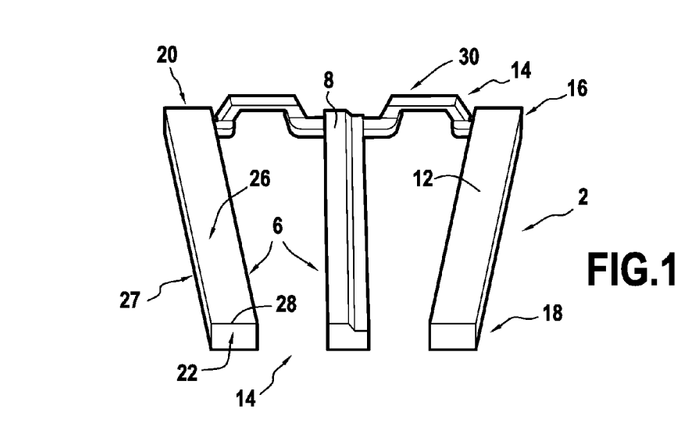
FIGS. 1 and 2 are perspective views of two subassemblies that make up a lighting device according to a first embodiment of the invention.

Here the first subassembly 2, shown in FIG. 1, includes three optical waveguides 6 disposed in transverse series and spaced from one another and structural elements 14 connecting the corresponding proximal ends 16 of these optical waveguides 6. Here the first subassembly 2 carries the central waveguide 8 and the lateral waveguides 12 spaced from the central waveguide 8 at their distal end 18 by a distance substantially equal to the width of the intermediate waveguide 10 that is to be placed between them on assembling the two subassemblies 2, 4, and a first part 30 of the first structural elements 14 is disposed transversely to the subassembly 2, 4, successively connecting each of the proximal ends 16 of the optical waveguides 6.

Figure 2:
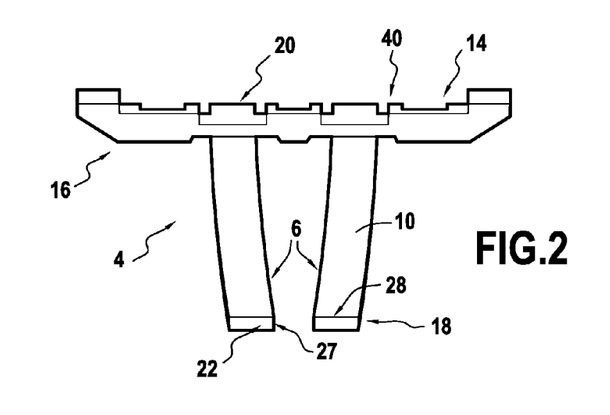

Here the second subassembly 4, visible in FIG. 2, includes two optical waveguides 6 disposed in transverse series and spaced from each other and a structural element 14 connecting one of the ends of each of the optical waveguides 6. Here the second subassembly 4 carries the intermediate waveguides 10 spaced from each other at their distal end 18 by a distance substantially equal to the width of the central waveguide 8 to be placed between them on assembling the two subassemblies 2, 4.

The second subassembly 4 includes a second part 40 of the first structural elements 14 which second part 40 is formed by female/male means that complement the male/female means that form the first part 30 of the first structural elements 14.

Each of the subassemblies 2, 4 is produced individually by molding and the shape of these subassemblies 2, 4, and the spacing provided between adjacent optical waveguides 6 of one and the same subassembly 2, 4 allows for ease of extraction from the mold. The two subassemblies 2, 4 are then mounted relative to one another by collaboration between the first part 30 and the second part 40 of the first structural elements 14. In this pre-assembly position, illustrated in FIG. 3, the optical waveguides 6 are pre-held relative to one another in this instance with their distal end 18 substantially in contact with the distal end 18 of the adjacent optical waveguide 6 and their proximal end 16 spaced away from the proximal end 16 of the adjacent optical waveguide 6.

There are two scenarios that may arise during this preassembly. Two successive optical waveguides 6 of the lighting device 1 may have exit faces 22 that are longitudinally offset from one another and two successive optical waveguides 6 may fail to be perfectly in contact with one another at their distal end 18. This is notably due to the manufacturing tolerances on the two subassemblies 2, 4.

Figure 3:
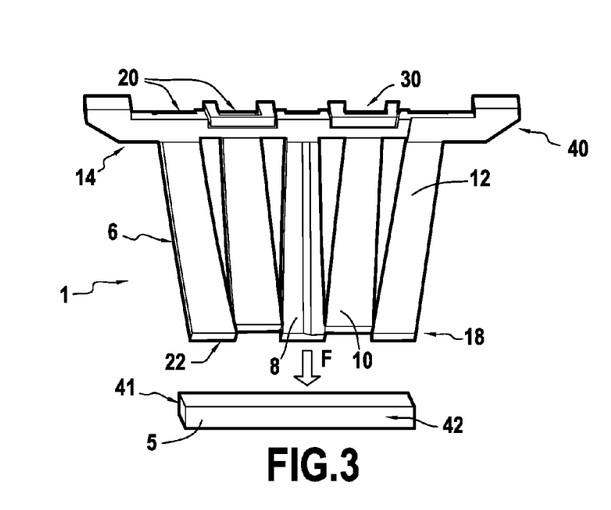
FIG. 3 is a perspective view of the two subassemblies assembled and of a piece of flexible material able to overlap the distal ends of the optical waveguides of these two subassemblies.

In a subsequent stage of the method for obtaining the lighting device 1 according to the invention, the two subassemblies 2, 4 joined together are pressed firmly against a piece of flexible material 5, pressing the distal ends 18 of the optical waveguides 6 against this piece of flexible material 5, as illustrated in FIG. 3 by the direction of the arrow F. It will be appreciated that, without departing from the scope of the invention, some other approach may be taken to securing the ends of the optical waveguides 6 and the piece of flexible material 5, notably by overmolding the piece onto the optical waveguides 6. The piece of flexible material 5 has a dimension along the transverse axis that is large enough that it overlaps all of the successive optical waveguides 6, but it will be appreciated that it is possible to anticipate a piece of flexible material 5 that overlaps only two successive optical waveguides 6. The arrangement of the flexible material 5 and of the end of the optical waveguides 6 that is embedded in this flexible material 5 is such that the flexible material 5 guarantees the assembly good mechanical integrity.

In an alternative form of embodiment, it is possible to provide a means of holding the piece of flexible material 5 in position, which means is mechanically connected to at least part of the first structural elements 14. Advantageously, the retaining means consists of a plate that is translucent or transparent so that it can extend downstream of the piece of flexible material 5 with respect to the path followed by the rays of light without impeding the propagation of these rays.

The piece of flexible material 5 is advantageously made of transparent silicone, for example from the liquid silicone elastomer (better known as liquid silicon rubber or LSR) family. It will be appreciated that it is important for the materials chosen for the piece of flexible material 5, which needs to deform under the effect of the pressure of the optical waveguides 6, to be more flexible than the material chosen for the optical waveguides 6. For preference, the optical index of the material of which the piece of flexible material 5 is made is substantially close, or even identical, to that of the material of which the optical waveguides 6 are made.

Under the effect of the pressure applied, the entry face 41 of the piece of flexible material 5, which is in contact with the optical waveguides 6, deforms, and the flexible material 5 becomes lodged between the distal ends 18 of the optical waveguides 6 if these distal ends 18 are not perfectly bonded together. Moreover, the collection of optical waveguides 6 is pushed against the piece of flexible material 5 at least until the optical waveguide 6 that is shortest in its longitudinal dimension comes into contact with the entry face 41 of the piece of flexible material 5. That then ensures continuity for the propagation of the rays of light. The exit face 42 of the piece of flexible material 5, arranged on the opposite side to the entry face 41, is not deformed by the pressure applied by the optical waveguides 6 because of the thickness of the flexible material 5, and it forms an exit face that is common to all of the optical waveguides 6.

The rays of light emitted by the light sources and penetrating the optical waveguides 6 via their respective entry face 41, are reflected within each optical waveguide 6 all the way to the common exit face 42 of the piece of flexible material 5, it being possible for rays deflected by one optical waveguide 6 to cross rays deflected by the adjacent optical waveguide 6 at the level of the piece of flexible material 5. That then ensures a beam of light that is homogeneous when all the sources are switched on, without the creation of any dark region between two segments of the beam. Moreover, the role of this flexible piece of material 5 is also to join the optical waveguides 6 together at their distal ends 18 without there being any need to specify very tight and, therefore, very expensive, manufacturing tolerances. The piece of flexible material 5 therefore has the role of absorbing, in all three directions, the offset in the positioning of the successive optical waveguides 6 with respect to a theoretical position in which the distal ends 18 are in contact over a given distance and are aligned to form a uniform light exit plane and to offer the light an exit surface that is planar so as to make it easier to position in a focal zone of a projection system. The exit face 42 that each of the optical waveguides 6 have in common is substantially planar, nondeformed, whereas the entry face 41 of the piece of flexible material 5 is deformed according to the manufacturing defects and/or assembly clearances left between the optical waveguides 6.

The lighting device 1 that is created by assembling the two subassemblies 2, 4 and superposing a layer of flexible material 5 overlapping the distal end 18 of the optical waveguides 6 can then be fixed into the lighting module by a fixing support that takes the form of a transverse plate comprising two transverse uprights on which the optical waveguides 6 rest and two lateral fixing lugs that can be brought together on the structure of the module and allow the lighting device 1 to be inserted in the desired location in the module.

Figure 5:
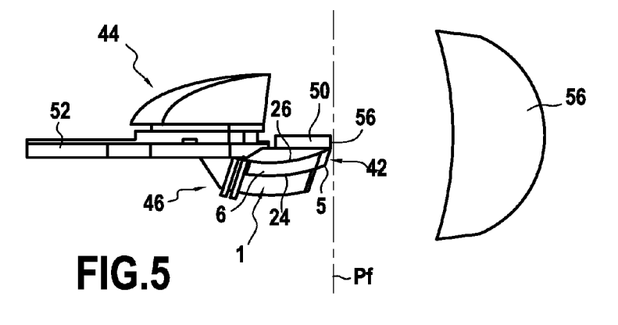
FIG. 5 is an overall view of a lighting module for a motor vehicle headlight in which use has been made of the lighting device of FIG. 1.

FIG. 5 illustrates a lighting module in which the lighting device 1 that has just been described is installed. The module is a so-called dual function module, that is to say a module in which two sub-modules 44, 46 are arranged one against the other to provide, in a complementary manner, a "high beam" function and "low beam" function by projection of light beams toward an optical projection device or lens 48 disposed at the exit from the module.

The module is included in a lighting system 1 that also includes control means for turning on, turning off or modifying the luminous power emitted by each light source of each module. These control means could be specific to each module or consist in single control means if each light source of the lighting system 1 can be controlled simultaneously. The lighting system 1 further includes a module for detecting a body on the road that is not to be dazzled. This detection module consists, for example, in a camera facing the road in front of the vehicle and associated image processing means that make it possible to generate detection information that the detection module is able to send to the control means to turn on, turn off or modify the luminous power emitted by each light source as a function of this detection information.

It is particularly beneficial to propose a lighting system 1 comprising at least two light modules such as might be described here. These modules are arranged so that at least one of the modules is disposed in a left-hand headlight of the vehicle and at least one of the modules is disposed in the corresponding right-hand headlight. A plurality of lighting modules could be provided in each headlight. The modules are arranged relative to one another, either in the same headlight or between the two headlights, so that at least one beam portion, for example a segment, produced by one of the modules overlaps at least a beam portion, in the present example a segment, produced by another of the modules.

In at least one module of each headlight formed of two sub-modules 44, 46, the first sub-module 44 is adapted to produce a first cut-off beam, to provide the "low beam" function, and the second sub-module 46 is adapted to produce a second beam complementary to the first beam so that these two beams when superposed together produce the "high beam" function. By complementary beam is meant a beam that with the beam produced by the first sub-module 44 produces a coherent beam when the two sub-modules 44, 46 are controlled to emit simultaneously the light beam that is specific to them.

The module includes a shield 50, for example coated with a reflective coating so as to form a deflector, and a support plate 52 that lie substantially in the median plane of the module, between the two sub-modules 44, 46, the shield 50 notably extending along the path of the rays reflected by the first sub-module 44 to produce in a known manner the cut-off of the first beam, while the support plate 52 carries the two sub-modules 44, 46 and their respective light sources together with means, not depicted here, for cooling it all. The shield 50 has a cut-off edge 56 that has a curved profile, notably including an inclined plane, for example a step shape substantially at the center of the cut-off edge 56. The central reflection area is therefore composed of two distinct parts offset vertically relative to each other, an inclined plane, for example inclined at 15° or 45°, connecting them to form the step. Other types of profile may be provided, such as a non-stepped profile, for example.

The complementary beam from the second sub-module 46 is a selective beam making it possible to produce a non-dazzling high beam function with a beam divided into several portions that can be turned on or off selectively in accordance with the instructions controlling the light sources associated with the second sub-module 46. The lighting function produced by each beam portion can be turned off or attenuated in order to form an area that does not dazzle a driver of a vehicle detected in the road view on the upstream side of the vehicle at the same time as making it possible to preserve good lighting conditions for the remainder of the road view.

The second sub-module 46 notably includes on the one hand a plurality of light sources that can be activated selectively to emit rays of light simultaneously or alternately and on the other hand the lighting device 1 described above and composed of a plurality of optical waveguides 6. The lighting device 1 and the diodes are positioned relative to one another so that each source is able to cooperate with one of the optical waveguides 6 to form images of those sources at the level of a focal zone, notably a curved focal surface P of the projection optical device in order for these images to be projected by the projection device at the exit of the module. Each beam portion is produced by the cooperation of a light source and an associated optical waveguide 6 and here these beam portions take the form of straight rectilinear strips corresponding to the shapes of the exit faces 22 of the optical waveguides 6 of the lighting device 1.

The lighting device 1 in accordance with the invention is arranged in the second sub-module 46. The exit faces 22 of the optical waveguides 6 face toward the projection device or lens 48 and the entry faces 20 face toward a structural element 14 on which the light sources are mounted so that they face the entry face 20 of the corresponding optical waveguide 6. Moreover, the reflection face 24 faces away from the shield 50 while the front face 26 faces toward the shield 50. The lighting device 1 is arranged in the module so that the optical waveguides 6 are in contact with the shield 50 only in the vicinity of the curved focal surface Pf of the projection device or lens 48. It is the piece of flexible material 5 disposed to overlap the distal end 18 of each optical waveguide 6 that is in contact with the shield 50, the line of contact between the piece of flexible material 5 and the shield 50 being in the focal surface Pf of the projection device or lens 48. With this arrangement, the piece of flexible material 5 makes it possible to ensure sufficient contact between the optical waveguides 6 and the shield 50 to guarantee, in addition to correct mechanical integrity of the assembly as was specified earlier, the absence of inhomogeneity between the low beam and the high beam: the first sub-module 44, disposed on one side of the shield 50, is used to create the low beam or beam with cutoff, and the second sub-module 46, disposed on the other side of the shield 50, is used to create a second beam that complements the low beam so that together they form the high beam. The presence of the flexible material 5 in contact with the shield 50 makes it possible to smooth out differences in lighting that could exist in the region where the two complementary beams meet.

This arrangement and the substantially elliptical shape of the reflection face 24 of each optical waveguide 6, as described above, makes it possible for the rays of light to exit the optical waveguide 6 at the top of the exit face 22, to ensure that some of these rays reach the lens directly in the upper portion and others are reflected by a lower face of the shield 50 to reach the lower portion of the projection device or lens 48.

Moreover, the fact that it is the piece of flexible material 5 that is in contact with the shield 50 and that the exit face 42 is disposed in the focal surface Pf makes it possible to ensure that the zones of overlap of the images, which are formed at least by the thickness of the piece of flexible material 5, are positioned upstream of the focal surface of the projection device or lens 48, thereby making it possible to project a complementary beam the various portions of which are smoothed in order to avoid a vertical cutoff, in the case of beam segmentation, that is too sharp.

Each of the light sources consists in a semiconductor source, for example a light-emitting diode fixed to a printed circuit board or mounted directly on structural elements of the lighting device 1. The light sources are disposed in transverse series with a spacing between sources that may advantageously be between 5 and 10 mm and is substantially equal to the transverse spacing between two successive optical waveguide entry faces 20 of the lighting device 1 so that each optical waveguide 6 is indeed disposed facing one of these light sources.

The series of optical waveguides 6 of the lighting device 1 is centered transversely in the module so that the central optical waveguide 8 and the upper edge of its distal end 18 cooperate with the inclined plane of the shield 50. As a result, the intermediate optical waveguides 10 and the lateral optical waveguides 12 extend transversely on either side of this inclined plane of the shield 50. Given that the vehicle includes two headlights, one on the left-hand side and one on the right-hand side, the superposition of the left-hand and right-hand beams produces a complete complementary high beam in which each segment of the high beam can be lit either strongly, by turning on the corresponding two segments of the left-hand and right-hand beams, or partially by turning on the segment of one of the beams or by turning on the segment of the other beam, or turned off completely. Moreover, it is interesting to note that in accordance with the invention a lighting device 1 may in accordance with the invention be installed interchangeably in the module of a left-hand headlight or in the module of a right-hand headlight, which simplifies the fitting of the headlights.

In the example illustrated, there are five light sources for the same number of optical waveguides 6, but it will be appreciated that the number may differ and not necessarily be an odd number as it is here, provided that the lighting device 1 is produced by two subassemblies 2, 4 of optical waveguides 6 that are placed between one another and that the aim is to secure these at one of their ends using the presence of an attached piece of flexible material 5.

Figure 7:
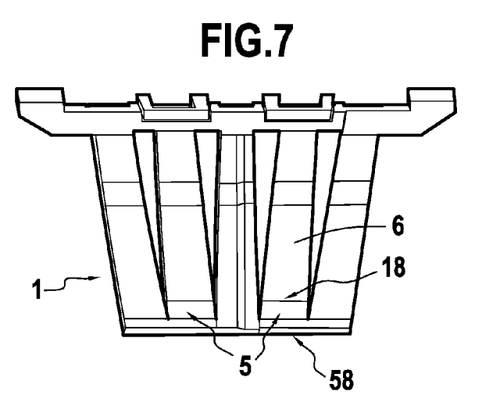
FIGS. 7 and 8 are illustrations of alternative ways of fitting a piece of flexible material in the lighting device of FIG. 6.
Figure 8:
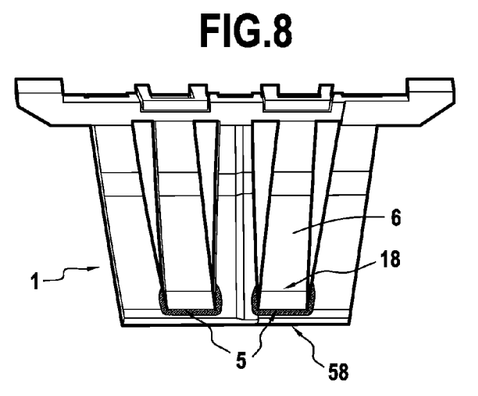

A second embodiment will now be described with reference notably to FIGS. 6 to 8, in which the structure of the subassemblies 2, 4 differs from the first embodiment in that the first subassembly 2 bears second structural elements 58 which hold at least some of the optical waveguides 6 between them at the level of the distal end 18.

These second structural elements 58 take the form of two plates disposed on either side of the central waveguide 8 and transversely extending the distal end 18 of the central waveguide 8 so as to overlap the exit faces 22 of the lateral optical waveguides 12. The plates or structural elements 58 thus form a strip 60 made of a translucent or transparent material and arranged transversely, downstream of the distal ends 18 in the path of the rays of light.

Figure 6:
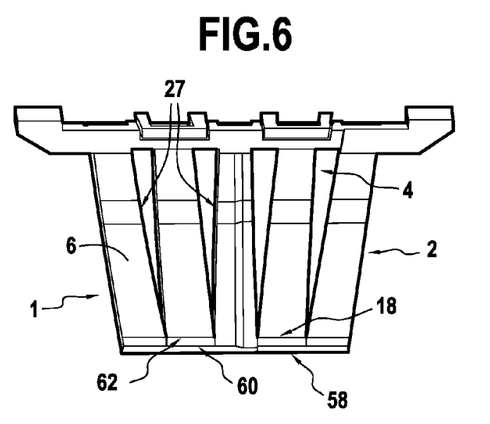
FIG. 6 is a face-on view of two subassemblies that form a lighting device according to a second embodiment.

As illustrated in FIG. 6, the strip 60 and two successive optical waveguides 6 of the first subassembly 2 define an accommodating housing 62 of dimensions suited to accommodating a distal end 18 of an optical waveguide 6 of a second subassembly 4, it being understood that when the two subassemblies 2, 4 are assembled, the exit face 22 of the optical waveguide 6 of the second subassembly 4 needs to be positioned facing the strip 60.

A piece of flexible material 5 is arranged in the accommodating housing to take up a position between the exit face 22 and the strip 60 and/or to take up a position between the lateral faces 27 of the optical waveguides 6 defining the housing 62 and the optical waveguide 6 of the second subassembly 4 that becomes inserted into the housing 62. The piece of flexible material 5 may be overmolded on the distal end 18 of the optical waveguide 6 of the second subassembly 4 (FIG. 7) so as to extend the optical waveguide 6 substantially in the longitudinal direction, or alternatively it may be arranged in the housing 62 or equally well on the strip 60 as on the faces of the successive optical waveguides 6 of the first subassembly 2, so as to be deformed when the optical waveguide 6 of the second subassembly 4 is inserted (FIG. 8). In both instances, the flexible material 5 makes it possible to fill the gap that may form between two successive optical waveguides 6 of the lighting device 1 when the subassemblies 2, 4 are assembled, or between the distal end 18 of an optical waveguide 6 and the strip 60 forming the second structural elements 58.

The foregoing description explains clearly how the invention makes it possible to achieve the objectives set for it and notably to propose a lighting device 1 that facilitates the design and the manufacture of a plurality of optical waveguides 6 and their incorporation into a module facing light sources to waveguide rays of light and create an adaptive beam.

The lighting device 1 is particularly easy to produce by a molding process because of the design as two subassemblies 2, 4 in each of which large spaces are left between the optical waveguides 6. The tooling and the corresponding molds are therefore easier and less costly to design and manufacturing losses are reduced. Furthermore, the use of an attached piece of flexible material 5, to overlap at least a distal end 18 of one of the optical waveguides 6 in order to make the connection with at least one adjacent optical waveguide 6 makes it possible to consider designing these subassemblies 2, 4 with provision for functional clearances so that assembling the subassemblies 2, 4 does not entail forcibly inserting an optical waveguide 6 from one subassembly 2, 4 between two optical waveguides 6 of another subassembly 2, 4, something that could cause damage to one of the optical waveguides 6.

As may have been specified already, the presence of the piece of flexible material 5 at the end of the optical waveguides 6 also makes it possible to compensate for defective alignment of the exit faces 22 of the optical waveguides 6 relative to one another, and offer an exit face 22 that is uniform and substantially planar.

It is particularly beneficial for this piece of flexible material 5 to be disposed between the exit faces 22 of the optical waveguides 6 and the optical projection device or lens 48 and for it to be translucent or transparent so as to form a light exit face 22 that has no transverse discontinuities which could otherwise form dark patches in the beam projected subsequently.

Of course, various modifications may be made by the person skilled in the art to the structure of the lighting device 1 that has just been described by way of nonlimiting example, notably in terms of the number of optical waveguides 6 and the shape of the structural elements 14 of the subassemblies 2, 4, provided that the lighting device 1 includes in accordance with the invention a plurality of optical waveguides 6 carried by a plurality of subassemblies 2, 4 and an attached piece of flexible material 5 for connecting at least two optical waveguides 6 together at the level of their distal end 18. In any event, the invention should not be regarded as limited to the embodiment specifically described in this document and in particular embraces all equivalent means and any technically operative combination of those means.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting module able to be mounted in a motor vehicle headlight, wherein said lighting module includes first means including a lighting device including a series of optical waveguides each able to allow rays of light to be waveguided between an entry face, arranged at a proximal end of each of said series of optical waveguides, and an exit face,
   wherein said lighting device is formed of at least two subassemblies produced separately and each including at least a portion of said series of optical waveguides and first structural elements for retaining said series of optical waveguides in position and joining successive optical waveguides of said at least two subassemblies together, said at least two subassemblies being able to be assembled to form said lighting device,
   wherein distal ends of at least two successive optical waveguides of said series of optical waveguides are connected by a piece of translucent or transparent flexible material;
   wherein said lighting device participates in the production of a plurality of light segments that can be activated selectively.

2. The lighting module according to claim 1, wherein said series of optical waveguides are disposed so that the respective distal ends, carrying said exit face, of two adjacent waveguides are in contact with each other and so that the respective proximal ends, carrying said entry face, of said two adjacent waveguides are transversely spaced from each other.

3. The lighting module according to claim 1, wherein said distal ends of each of said series of optical waveguides are covered by said piece of translucent or transparent flexible material which forms a continuous strip extending downstream of the entire of said series of optical waveguides.

4. The lighting module according to claim 3, wherein said piece of translucent or transparent flexible material has a continuous face extending away from said series of optical waveguides and forming a common exit face that said series of optical waveguides of said lighting device have in common.

5. The lighting module according to claim 1, wherein said piece of translucent or transparent flexible material is disposed between at least two distal ends of two successive optical waveguides of said lighting device.

6. The lighting module according to claim 1, wherein at least a first subassembly further includes a second structural element, distinct from said first structural element and able to connect said distal ends of said series of optical waveguides of said first subassembly.

7. The lighting module according to claim 6, wherein said second structural element consists of a strip made of a translucent or transparent material and disposed transversely, downstream of said distal ends in the path of said rays of light, said strip and two successive waveguides of said first subassembly defining a housing to accommodate said distal end of a waveguide of said second subassembly so that said exit face of said waveguide rests against said strip.

8. The lighting module according to claim 7, wherein said piece of translucent or transparent flexible material is disposed in said accommodating housing.

9. The lighting module according to claim 7, wherein said piece of translucent or transparent flexible material is overmolded onto said second structural element and onto a face of the successive waveguides of said first subassembly that defines said accommodating housing.

10. The lighting module according to claim 1, wherein said piece of translucent or transparent flexible material is made from a material that has a refractive index substantially close to, or even identical to, that of a material of said series of optical waveguides.

11. The lighting module according to claim 1, wherein said piece of translucent or transparent flexible material is made from a material that has greater flexibility than the flexibility of a material used to produce said series of optical waveguides.

12. The lighting module for motor vehicle lighting and/or signaling according to claim 1, wherein said lighting module includes second means adapted to produce a first cut-off beam directed toward a projection device arranged at an exit of said lighting module, said plurality of light segments produced by said first means forming a second beam directed toward said projection device and complementary to said first cut-off beam when they are activated simultaneously.

13. The lighting module according to claim 12, wherein said second means include at least one optical means, at least one light source disposed at the level of a focus of said at least one optical means and a shield disposed on the path of the rays of light coming from said at least one light source and deflected by said at least one optical means so as to produce the beam with a cutoff, and in that said series of optical waveguides of said lighting device are disposed in such a way as to be in contact with said shield.

14. The lighting module according to claim 13, wherein said series of optical waveguides are oriented in such a way as to be in contact with said shield only in the vicinity of a focal zone of said projection device.

15. The lighting module according to claim 13, wherein contact with said shield is established at the level of said piece of flexible translucent or transparent material.

16. A lighting system comprising at least one lighting module according to claim 12, and control means for turning on, turning off or modifying the luminous power emitted by said first means and said second means of said lighting module.

17. The lighting module according to claim 2, wherein said distal end of each of said series of optical waveguides is covered by said piece of translucent or transparent flexible material which forms a continuous strip extending downstream of the entire of said series of optical waveguides.

18. The lighting according to claim 2, wherein said piece of translucent or transparent flexible material is disposed between at least two distal ends of two successive optical waveguides of said lighting device.

19. The lighting module according to claim 14, wherein contact with said shield is established at the level of said piece of flexible translucent or transparent material.

* * * * *